(12) United States Patent
Benkreira et al.

(10) Patent No.: US 11,270,281 B2
(45) Date of Patent: Mar. 8, 2022

(54) SYSTEMS AND METHODS FOR THE SECURE ENTRY AND AUTHENTICATION OF CONFIDENTIAL ACCESS CODES FOR ACCESS TO A USER DEVICE

(71) Applicant: Capital One Services, LLC, McLean, VA (US)

(72) Inventors: Abdelkader M'Hamed Benkreira, Washington, DC (US); Michael Mossoba, Arlington, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 274 days.

(21) Appl. No.: 16/038,819

(22) Filed: Jul. 18, 2018

(65) Prior Publication Data

US 2020/0013248 A1    Jan. 9, 2020

Related U.S. Application Data

(63) Continuation of application No. 16/030,027, filed on Jul. 9, 2018, now Pat. No. 10,395,230.

(51) Int. Cl.
*G06Q 20/20* (2012.01)
*G06F 21/31* (2013.01)
(Continued)

(52) U.S. Cl.
CPC ....... *G06Q 20/206* (2013.01); *G06F 3/04883* (2013.01); *G06F 3/04886* (2013.01);
(Continued)

(58) Field of Classification Search
CPC .............................. G06Q 20/206; G06F 21/31
See application file for complete search history.

(56) References Cited

U.S. PATENT DOCUMENTS 5,731,575 A    3/1998   Zingher et al.
5,786,587 A *  7/1998   Colgate, Jr. ............ G06K 19/14
                                                235/454
(Continued)

FOREIGN PATENT DOCUMENTS

WO    WO-2018106041 A1 *  6/2018   ........... G06F 3/0482

OTHER PUBLICATIONS

Kim et al. "FakePIN: Dummy Key Based Mobile User Authentication Scheme" Ubiquitous information technologies & applications; CUTE 2013 ; 157-164 ; 2014 (Year: 2014).*

(Continued)

*Primary Examiner* — Nathan A Mitchell
(74) *Attorney, Agent, or Firm* — Finnegan, Henderson, Farabow, Garrett & Dunner, LLP

(57) ABSTRACT

The present disclosure relates to systems and method for securely entering a confidential access code into a user device. A system for allowing secure entry of a confidential access code into a user device may include one or more memories storing instructions and one or more processors configured to execute instruction to perform operations. The operations may include receiving a request for confidential access, prompting the user, via the user interface, to enter a group of inputs into a single-entry field, receiving a dummy sequence of inputs, receiving or providing an indicator signal, receiving an access sequence of inputs, parsing the group of inputs received to identify the access sequence of inputs based on the location of the indicator signal, comparing the access sequence of inputs to the confidential access code associated with the user, and granting or denying access to the confidential information based on the results.

18 Claims, 6 Drawing Sheets

(51) Int. Cl.
*G07C 9/33* (2020.01)
*G06F 3/0488* (2013.01)
*G07F 19/00* (2006.01)
*G06F 3/04883* (2022.01)
*G06F 3/04886* (2022.01)

(52) U.S. Cl.
CPC ............... *G06F 21/31* (2013.01); *G07C 9/33* (2020.01); *G07F 19/20* (2013.01); *G06F 2221/2111* (2013.01)

(56) References Cited

U.S. PATENT DOCUMENTS

| | | | | |
|---|---|---|---|---|
| 6,246,769 | B1* | 6/2001 | Kohut | G06Q 20/341 380/45 |
| 6,871,288 | B2 | 3/2005 | Russikoff | |
| 6,990,586 | B1* | 1/2006 | Tresser | G07F 7/1008 713/182 |
| 8,733,642 | B2 | 5/2014 | Sparks | |
| 9,196,111 | B1 | 11/2015 | Newman et al. | |
| 9,230,092 | B1* | 1/2016 | Juels | H04L 63/083 |
| 2005/0160268 | A1* | 7/2005 | Chaki | H04L 9/0844 726/26 |
| 2006/0253389 | A1* | 11/2006 | Hagale | G06Q 40/00 705/39 |
| 2007/0145121 | A1* | 6/2007 | Dallal | G06Q 20/40145 235/380 |
| 2010/0218241 | A1* | 8/2010 | Faryna | G06F 21/43 726/5 |
| 2010/0223667 | A1* | 9/2010 | Acuna | G06F 21/575 726/19 |
| 2012/0197796 | A1* | 8/2012 | Dent | G06Q 20/1085 705/43 |
| 2012/0299701 | A1* | 11/2012 | Zou | G06K 9/50 340/5.54 |
| 2013/0127725 | A1* | 5/2013 | Sugimoto | G06F 3/04886 345/168 |
| 2014/0091907 | A1* | 4/2014 | Yu | G07C 9/20 340/5.65 |
| 2014/0181529 | A1* | 6/2014 | Joyce, III | H04L 9/3247 713/183 |
| 2014/0374477 | A1* | 12/2014 | Korala | G07F 17/42 235/379 |
| 2017/0185806 | A1* | 6/2017 | Kong | G06F 21/45 |
| 2017/0213426 | A1 | 7/2017 | Schwartz | |
| 2018/0089404 | A1* | 3/2018 | Uchida | G06F 21/31 |
| 2018/0224989 | A1* | 8/2018 | Deasy | G06F 3/023 |
| 2018/0300464 | A1* | 10/2018 | Mahfouz | H04L 9/3226 |

OTHER PUBLICATIONS

Translation of WO2018106041A1 (Year: 2018).*

* cited by examiner

SYSTEMS AND METHODS FOR THE SECURE ENTRY AND AUTHENTICATION OF CONFIDENTIAL ACCESS CODES FOR ACCESS TO A USER DEVICE

This application is a continuation of U.S. patent application Ser. No. 16/030,027, filed Jul. 9, 2018, which is expressly incorporated herein by reference in its entirety.

TECHNICAL FIELD

This disclosure relates generally to the field of user authentication and authorization. More specifically, and without limitation, this disclosure relates to systems and methods for the secure entry of a confidential access code into a user device.

BACKGROUND

To access bank account information, or to withdraw money, users typically take advantage of conveniently located Automated Teller Machines ("ATM"). An ATM is a telecommunications device that allows users to obtain account information or perform financial transactions without the need to interact with the bank staff. A user can gain access to an ATM through the use of a bank card, such as a credit, debit, or other acceptable payment card. The user starts the process by inserting the bank card into the ATM. Authentication is then carried out through the entry of a confidential access code by the user. The confidential access code entered by the user is compared to a personal identification number (PIN) stored on the card or in the issuing financial institution's database. Once authenticated, the user can use the ATM to carry out the desired financial transactions.

A common ATM security issue involves "skimming," which is used to record users' PINs and other bank card information, allowing the thief to gain unauthorized access to users' bank account. In most instances, skimming involves installing a card reader and miniature camera onto the ATM. The card reader reads the magnetic strip of a bank card. The potential thieves place this device over the card input slot of the ATM, and the device reads the magnetic strip as the card is passed through it. However, the potential thieves still need to acquire the user's PIN in order to access the bank account. This can be done in multiple ways. A common method is to attach a miniature camera to the ATM. The miniature camera is placed in a position to view the keypad of the ATM while remaining unseen to the user. Another method is where the potential thieves may put a keypad overlay overtop of the legitimate buttons. The keypad overlay then records or wirelessly transmits the PIN information it keylogged. The group of devices illicitly installed on machines are typically referred to as "skimmers."

Various solutions have been attempted in an effort to improve the security of ATMs. These solutions range from posting a security guard near the ATM, to having the ATM provide a picture of what a normal slot and keypad look like so the user can confirm there are no skimmers on the device. Such solutions are shown, for example, in U.S. Pat. Nos. 5,731,575; 6,871,288; 8,733,642; 6,871,288; 8,733,642; and 9,196,111; and U.S. Patent Application No. 2017/0213426. However, none have been completely satisfactory Accordingly, there remains a need for improved systems and methods for the secure entry of a PIN to an ATM.

SUMMARY

In one aspect, there is provided a user device for providing secure entry of a confidential access code. The user device includes a user interface, one or more memories storing instructions, and one or more processors configured to execute the instructions to perform operations. The operations include receiving, from a user through the user interface, a request for confidential access; prompting the user, via the user interface, to enter a group of inputs into a single-entry field; and receiving a group of inputs from the user device, the received group comprising first, second, and third sequences of inputs. The operations further include parsing the received group of inputs to identify the second sequence of inputs as an indicator sequence of inputs; identifying the access sequence of inputs, based on the indicator sequence of inputs; and comparing the access sequence of inputs with a confidential access code associated with the user. When the compared access sequence of inputs matches the confidential access code, the operations include granting access to the user device; and when the compared access sequence of inputs does not match the confidential access code, the operations include denying access to the user device.

In another aspect, there is provided a method for the secure entry of a confidential access code to a user device. The method includes receiving a request for a confidential access associated with a user at the user device; displaying an input entry screen comprising a single-entry field on the graphical user interface of the user device; and receiving a first group of inputs at the user device, the received first group of inputs comprising an indicator sequence of inputs associated with the user. The method further includes determining when the indicator sequence of inputs is correctly entered; receiving a second group of inputs at the user device, the second group of inputs comprising an access sequence of inputs; transmitting the second group of inputs to the server; and receiving, from the server, an indication of whether the access sequence of inputs matches the confidential access code associated with the user. The method further includes granting or denying access to the user device based on the received indication.

In yet another aspect, there is provided a non-transitory computer-readable medium containing program instructions which, when executed by one or more processors, cause the one or more processors to provide secure entry by a user of a confidential access code into an Automatic Teller Machine by performing operations. The operations include receiving a request for confidential access to the ATM, the request comprising introducing a bank card into proximity to the ATM; displaying a single field for entering a PIN on the graphical user interface, and receiving a group of inputs, said group comprising a dummy sequence of inputs, an indicator sequence of inputs, and an access sequence of inputs. The operations further include transmitting the group of inputs received to a server and receiving a message from the server indicating whether the access sequence of inputs matches the confidential access code associated with the user. When the compared access sequence of inputs matches the confidential access code, the operations include granting access to the bank information associated with the bank card; and when the compared access sequence of inputs does not match the confidential access code, the operations include denying access to the bank information associated with the bank card.

It is to be understood that the foregoing general description and the following detailed description are exemplary and explanatory only and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

The disclosed embodiments relate to systems and methods for the secure entry of a confidential access code into a user device using an indicator signal. Embodiments of the present disclosure may be implemented using one or more general-purpose computers, e.g., one or more servers, one or more user devices, or the like. Alternatively, or concurrently, one or more special purpose computer may be built according to embodiments of the present disclosure using suitable circuit elements, e.g., one or more application-specific integrated circuits or the like.

As used herein, the term "confidential access code" may connote any combination of letters, numbers, and symbols that provides access to an otherwise restricted location.

Reference will be made in detail to exemplary embodiments and aspects of the present disclose, examples of which are illustrated in the accompanying figures.

Figure 1:
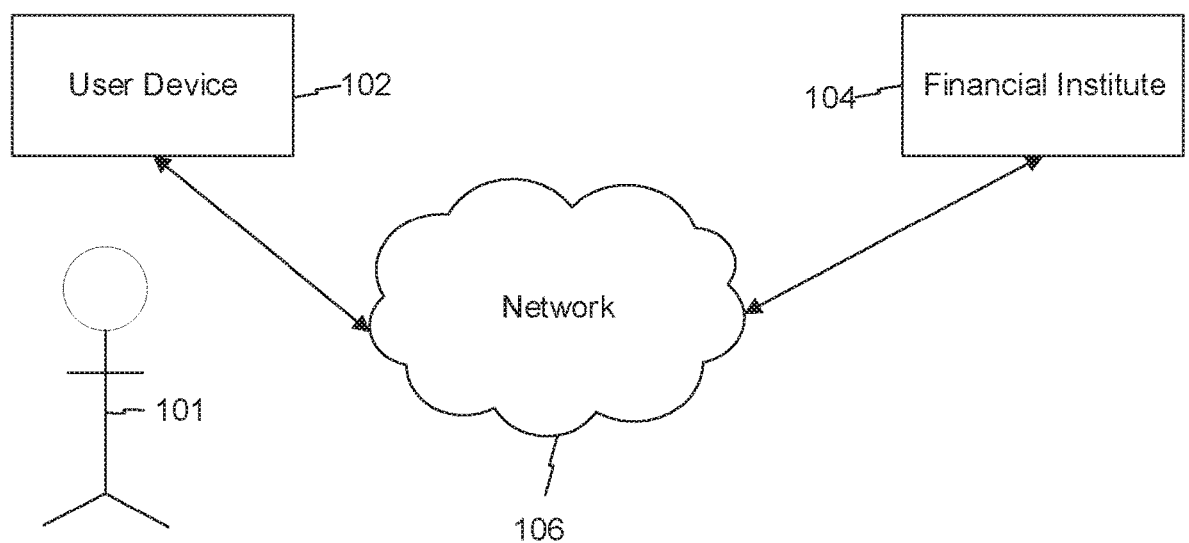
FIG. 1 is a block diagram of an exemplary system for the secure entry of a confidential access code into a user device, consistent with embodiments of the present invention.

FIG. 1 shows an exemplary system 100 for the secure entry of a confidential access code into a user device. System 100 allows a user 101 to connect to a financial institution 104 through a user device 102, by way of a network 106. Financial institution 104 may act as a database server with respect to requests received through the user device 102. User device 102 may comprise, for example, an ATM, a smartphone, a laptop computer, a tablet, or the like.

Figure 2:
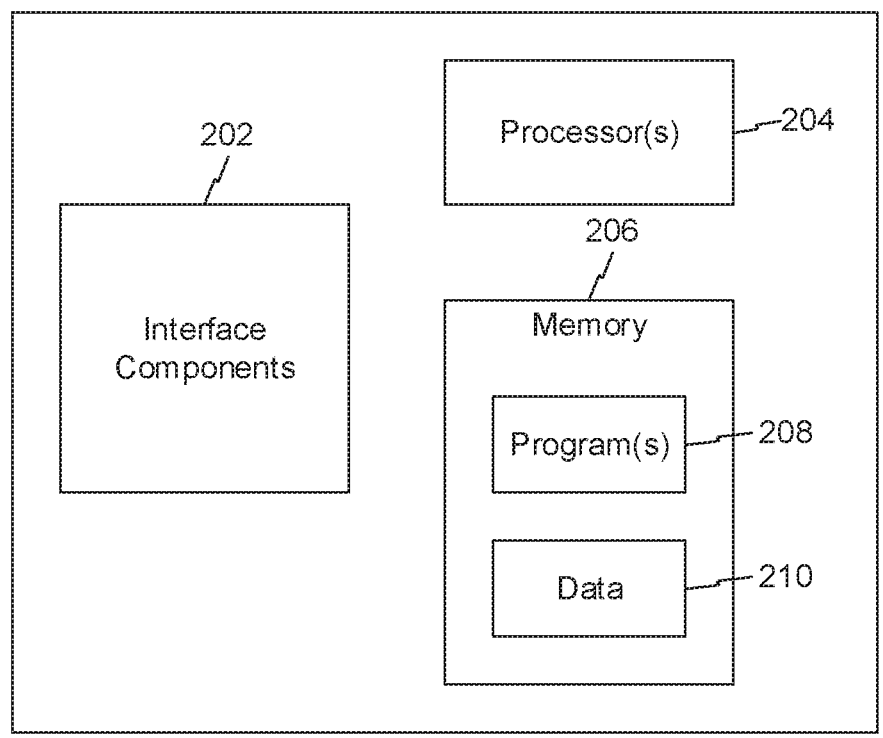
FIG. 2 is a block diagram of an exemplary user device designed for the secure entry of a confidential access code, consistent with embodiments of the present invention.

FIG. 2 is a block diagram of an exemplary user device 102. User device 102 may comprise at least one processor 204 configured to execute instructions, and at least one memory 206. Memory 206 may further comprise at least one program containing instructions 208, and data 210. User device 102 may also comprise interface components 202 providing a user interface, such as a graphical user interface (GUI).

Figure 3:
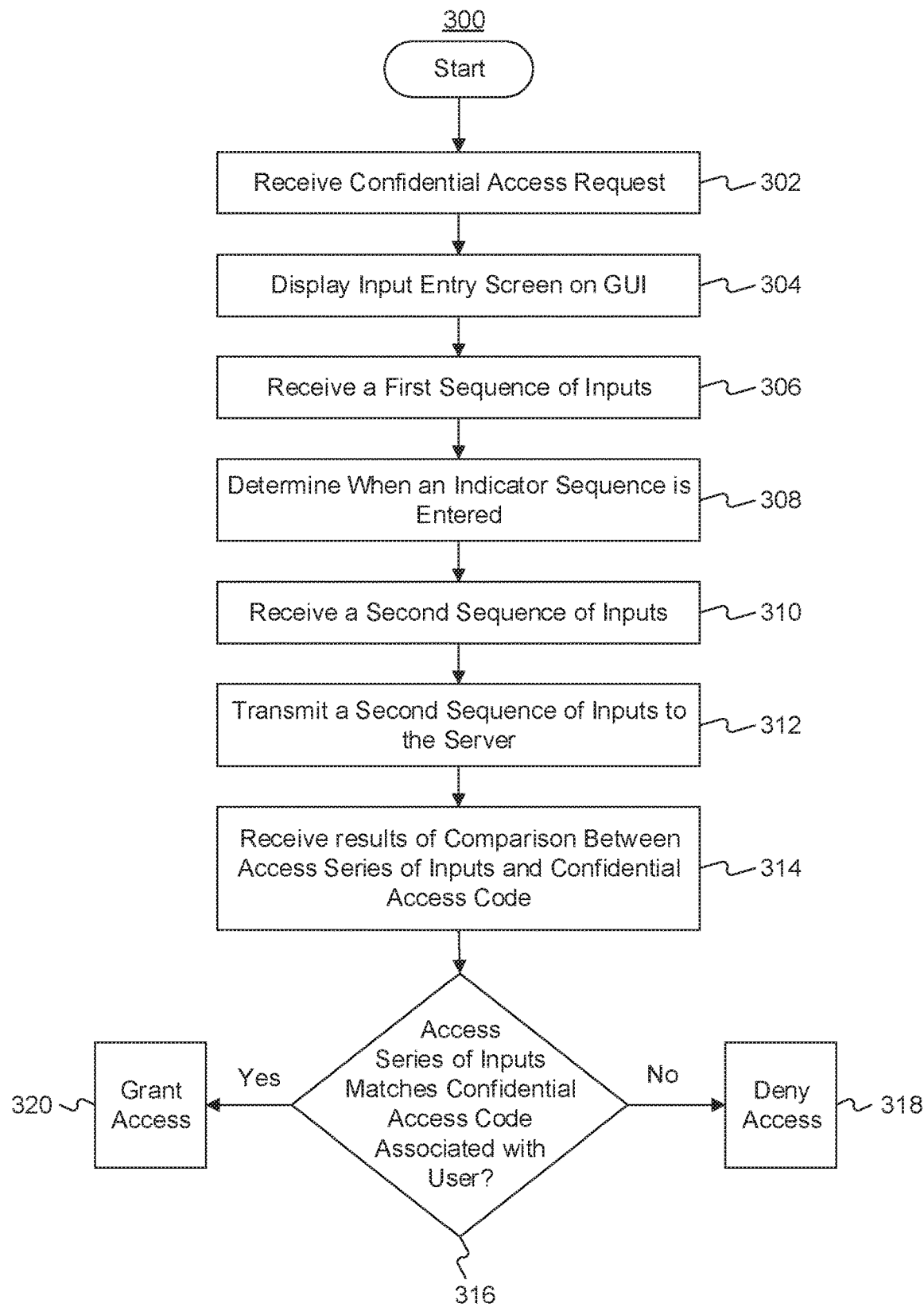
FIG. 3 is a flowchart of an exemplary method for the secure entry of a confidential access code into a user device, from the perspective of the user device, consistent with embodiments of the present invention.

FIG. 3 is a flowchart of the exemplary method 300 for the secure entry of a confidential access code into a user device, where a user provides the indicator signal. Method 300 may be implemented by, for example, processor 204 of FIGS. 1 and 2. Method 300 may further be implemented using a general-purpose computer or specialized computer having a processor.

At step 302, the method may receive a request for confidential access from the user through interface components 202. The confidential access request may comprise any action by user 101 requesting restricted access to user device 102. For example, the confidential access request may comprise a request to login to user device 102. By way of further example, the request for confidential access may comprise introducing a bank card associated with a user to an ATM. The bank card may comprise a physical card or a "virtual card" stored on the user's mobile phone or tablet. Introducing the bank card to the ATM may comprise inserting a physical card into the ATM or using a contactless payment method such as, for example, radio frequency identification (RFID) or near-field communication (NFC). In this example, introducing a bank card to an ATM may give user 101 the ability to enter a confidential access code into the ATM.

At step 304, the method may prompt user 101 to enter a group of inputs, for example, by display of an input entry screen on interface components 202. By way of further example, the input entry screen may be displayed on the graphical user interface of user device 102. The input entry screen may comprise a single-entry field for entry of user inputs. For example, the input entry screen may comprise a user login screen for display on the graphical user interface of user device 102 by which user 101 may enter login information into a single-entry field, confining all login information to one location. By way of further example, the input entry screen may be displayed as a login page on the graphical user interface of an ATM, allowing user 101 to enter all login information into the single field of entry displayed on the graphical user interface of the ATM.

At step 306, the method may receive a first group of inputs from user 101 by way of interface components 202. The first group of inputs may comprise a dummy sequence of inputs and an indicator sequence of inputs. In some embodiments, the group of inputs may comprise a dummy sequence of inputs, followed by an indicator sequence of inputs. The dummy sequence of inputs may comprise any number of inputs excluding the indicator sequence of inputs. For example, the dummy sequence of inputs may comprise 1, or 10, or 30 digits.

At step 308, the method may determine when an indicator sequence of inputs has been entered. The indicator sequence of inputs may comprise a sequence of inputs associated with user 101, and indicates to the system that the immediately following inputs constitute an access sequence of inputs. For example, if the indicator sequence consists of the digits nine, zero, zero, user 101 may enter any number of random inputs ending in "9," "0," "0". This will be interpreted by the system as an indication that the immediately following inputs (or, alternatively, the inputs received after a specified number of random inputs) will be an access sequence of inputs. The indicator sequence of inputs is associated with user 101, meaning that for this user, the indicator sequence will always be the same sequence, regardless of which user device 102 is being used.

In other embodiments, the indicator sequence of inputs may comprise any type of inputs available on the user device. In such embodiments, the indicator sequence of inputs may comprise any component of the user interface available for user interaction. For example, the indicator sequence of inputs may comprise inputs from the video camera, microphone, card reader, or any additional pressure sensitive buttons available on the user interface. By way of further example, when the user device is an ATM, the user 101 may provide the indicator sequence of inputs by pushing the bank card further into the card reader. In another example, when the user device is an ATM, the user 101 may provide the indicator sequence of inputs by winking into the camera located on the user interface of the ATM.

At step 310, the method may then receive a second group of inputs from user 101, including an access sequence. The access sequence of inputs may consist of a confidential access code associated with user 101. For example, the access sequence of inputs may comprise the PIN associated with a user's bank card, such as, for example, "1," "2," "3," "4." In some embodiments, the access sequence of inputs may be limited to a predetermined number of inputs. For example, the access sequence of inputs may be limited to four inputs.

In certain aspects, the second group of inputs may further comprise a second dummy sequence of inputs following the access sequence of inputs. The second dummy sequence of inputs may comprise any number of inputs. In some embodiments, when the access sequence of inputs is limited to a predetermined number of inputs, any sequence of inputs received after the predetermined number of inputs may be a dummy sequence of inputs. For example, if the access sequence of inputs is limited to four inputs, and there are six inputs in the second group of inputs, then the final two inputs may be the dummy sequence of inputs.

In certain aspects, the second group of inputs may further comprise a second indicator sequence of inputs and a second dummy sequence of inputs, following the access sequence. In some embodiments, the second indicator sequence may be identical to the first indicator sequence, such as "9," "0," "0". In other embodiments, the second indicator sequence of inputs may be different than the first indicator sequence of inputs. The second dummy sequence of inputs may comprise any number of inputs.

At step 312, the method may transmit the second group of inputs to financial institution 104 through network 106 for authentication. In some embodiments, the method may first parse the second group of inputs to identify the access sequence of inputs, "1," "2," "3," "4" in the example above, before transmitting to financial institution 104. In certain aspects, the first and second group of inputs may be parsed to determine the location of the indicator sequence of inputs. The location of the access sequence of inputs is determined based on the location of the indicator sequence of inputs. In other embodiments, the method may not parse the group of inputs received. For example, when the second group of inputs comprises only an access sequence of inputs, the method may transmit the second group of inputs to financial institution 104 without parsing. In some embodiments, the method may transmit the group of inputs to financial institution 104 to compare the access sequence of inputs with the confidential access code associated with user 101. For example, when user 101 is attempting to gain access to an ATM, the method may transmit the group of inputs to financial institution 104 to compare the access sequence of inputs with the personal identification number associated with user's 101 bank card.

At step 314, the method may receive the results of the comparison between the access sequence of inputs and the confidential access code associated with the user. In some embodiments, the method may receive the results of the comparison from financial institution 104 by way of network 106.

At step 316, the method may determine whether the results indicate a match or not. In some embodiments, the method may grant or deny access to user device 102 based on the results of the comparison. For example, at step 320, if the access sequence of inputs matches the confidential access code associated with user 101, user 101 may be granted access to user device 102. In another example, at step 318, if the access sequence of inputs does not match the confidential access code associated with user 101, user 101 may be denied access to user device 102.

Figure 4:
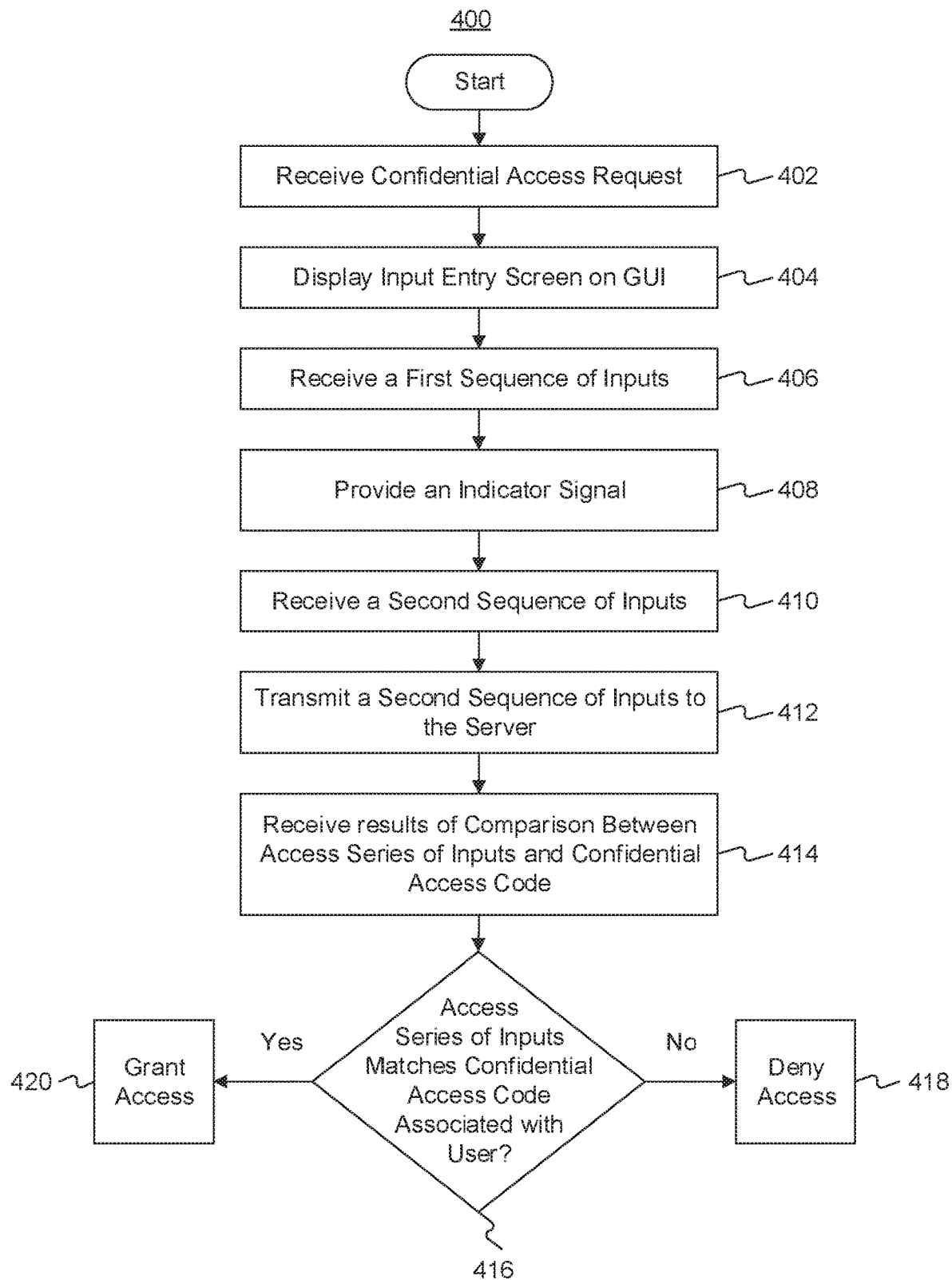
FIG. 4 is a flowchart of an exemplary method for the secure entry of a confidential access code into a user device, from the perspective of the user device, consistent with embodiments of the present invention.

FIG. 4 shows a flowchart of the exemplary method 400 for the secure entry of a confidential access code into a user device, where user device 102 provides the indicator signal to user 101. Method 400 may be implemented by, for example, processor 204 of user device 102 of FIGS. 1 and 2. Method 400 may further be implemented using a general-purpose computer or specialized computer having a processor.

At step 402, the method may receive a request for confidential access from user 101 through interface components 202. The confidential access request may comprise a designated action by user 101 such as a request to login to user device 102. By way of further example, the request for confidential access may comprise introducing a bank card associated with user 101 to an ATM. As noted for step 302, the bank card may comprise a physical card or a "virtual card" stored on the user's mobile phone or tablet. Introducing the bank card to the ATM may comprise inserting a physical card into the ATM or using a contactless payment method such as, for example, radio frequency identification (RFID) or near-field communication (NFC).

At step 404, the method may prompt user 101, by way of interface components 202, to enter a group of inputs. For example, the method may provide instructions to display an input entry screen on interface components 202. By way of further example, the input entry screen may be displayed on the graphical user interface of user device 102. The input entry screen may comprise a single-entry field for entry of user inputs. For example, the input entry screen may comprise a user login screen for display on the graphical user interface of user device 102. The user login screen may comprise a single-entry field for user 101 to enter login information. The single-entry field confines all login information to one location. By way of further example, the input entry screen may be displayed as a login page on the graphical user interface of an ATM. In this example, user 101 may enter all information into the single field of entry displayed on the graphical user interface of the ATM.

At step 406, the method may receive a first group of inputs from user 101 by way of interface components 202. The first group of inputs may comprise a dummy sequence of inputs. The dummy sequence of inputs may comprise any number of inputs excluding the indicator sequence of inputs. For example, the dummy sequence of inputs may comprise 1, or 10, or 30 random digits.

At step 408, the method may provide an indicator signal to user 101 through interface components 202. In certain aspects, the indicator signal may be provided through interface components 202 after a set number of dummy inputs is received. For example, the method may provide an indicator signal through user device 102 after receiving 10 dummy inputs. In other aspects, the indicator signal may be provided through interface components 202 after a randomized number of dummy inputs is received. For example, the method may provide an indicator signal through interface components 202 after receiving between 1 to 20 dummy inputs.

In certain aspects, the method may provide an indicator signal through interface components 202 after a pre-determined period of time following the request for confidential access. During this time period, a first group of inputs may be received. For example, the method may wait 30 seconds from the request for confidential access before it provides an indicator signal to user 101 through interface components 202. In some embodiments, the period of time between the request for confidential access and the indicator signal may be randomized. During this time period, a first group of inputs may be received. For example, the method may wait any amount of time from 20 to 300 seconds before it provides an indicator signal through interface components 202 following a request for confidential access. By way of further example, the processor may provide an indicator signal through the GUI of an ATM anywhere between 20 to 300 seconds following the entry of a bank card into the ATM.

The indicator signal may be generated by use of any component available on user device 102. In some embodiments, the indicator signal may comprise a visual cue provided by user device 102. For example, the indicator signal may comprise a flashing light provided through the user interface of user device 102. In other embodiments, the indicator signal may provide an auditory or tactile cue. For example, the indicator signal may provide a beeping sound or create a vibration through the user interface of user device 102. In certain aspects, the user interface may comprise a component designed to provide an indicator signal.

In still other embodiments, the indicator signal may comprise a command or set of instructions requiring user interaction. In certain aspects, the indicator signal may comprise a command or set of instructions involving the confidential access code of user 101. For example, the indicator signal may comprise a command or set of instructions for user 101 to enter only certain parts of the confidential access code. By way of further example, the command or set of instructions may comprise requiring user 101 to input only the second and fourth inputs of the confidential access code. In another example, the command or set of instructions may comprise requiring user 101 to input the confidential access code plus or minus a certain number. For example, the indicator signal may comprise a command to enter the normal confidential access code, minus 20.

At step 410, the method may receive a second group of inputs from user 101 by way of interface components 202. The second group of inputs may comprise an access sequence of inputs. The access sequence of inputs may comprise the sequence of inputs received following the indicator sequence of inputs. The access sequence of inputs may comprise a sequence of inputs that make up a confidential access code associated with user 101. For example, the access sequence of inputs may comprise the PIN associated with a user's bank card. In some embodiments, the access sequence of inputs may be limited to a predetermined number of inputs. For example, the access sequence of inputs may be limited to four inputs.

As noted with respect to method 300, in certain aspects, the second group of inputs may further comprise a second dummy sequence of inputs following the access sequence of inputs. The second dummy sequence of inputs may comprise any number of inputs. In some embodiments, when the access sequence of inputs is limited to a predetermined number of inputs, any sequence of inputs received after the predetermined number of inputs may be a dummy sequence of inputs. For example, if the access sequence of inputs is limited to four inputs, and there are six inputs in the second group of inputs, then the final two inputs may be the dummy sequence of inputs.

At step 412, the method may transmit the second group of inputs to financial institution 104 through network 106 for authentication. In some embodiments, the method may parse the group of inputs received from user device 102 to identify the access sequence of inputs before transmitting to financial institution 104. In certain aspects, the first and second group of inputs is parsed to determine when the indicator signal was provided. The location of the access sequence of inputs is determined based on when the indicator signal was provided. In other embodiments, the method may not parse the group of inputs received. For example, when the second group of inputs comprises only an access sequence of inputs, the method may transmit the second group of inputs to financial institution 104 without parsing. In some embodiments, the method may transmit the group of inputs to financial institution 104 to compare the access sequence of inputs with the confidential access code associated with user 101. For example, when user 101 is attempting to gain access to an ATM, the processor may transmit the group of inputs to financial institution 104 to compare the access sequence of inputs with the PIN associated with user's 101 bank card.

At step 414, the method may receive the results of the comparison between the access sequence of inputs and the confidential access code associated with user 101. In some embodiments, the method may receive the results of the comparison from financial institution 104 by way of network 106.

At step 416, the method may determine whether the results indicate a match or not. In some embodiments, the method may grant or deny access to the user device based on the results of the comparison. For example, at step 420, if the access sequence of inputs matches the confidential access code associated with user 101, user 101 may be granted access to user device 102. In another example, at step 418, if the access sequence of inputs does not match the confidential access code associated with user 101, user 101 may be denied access to user device 102.

Figure 5:
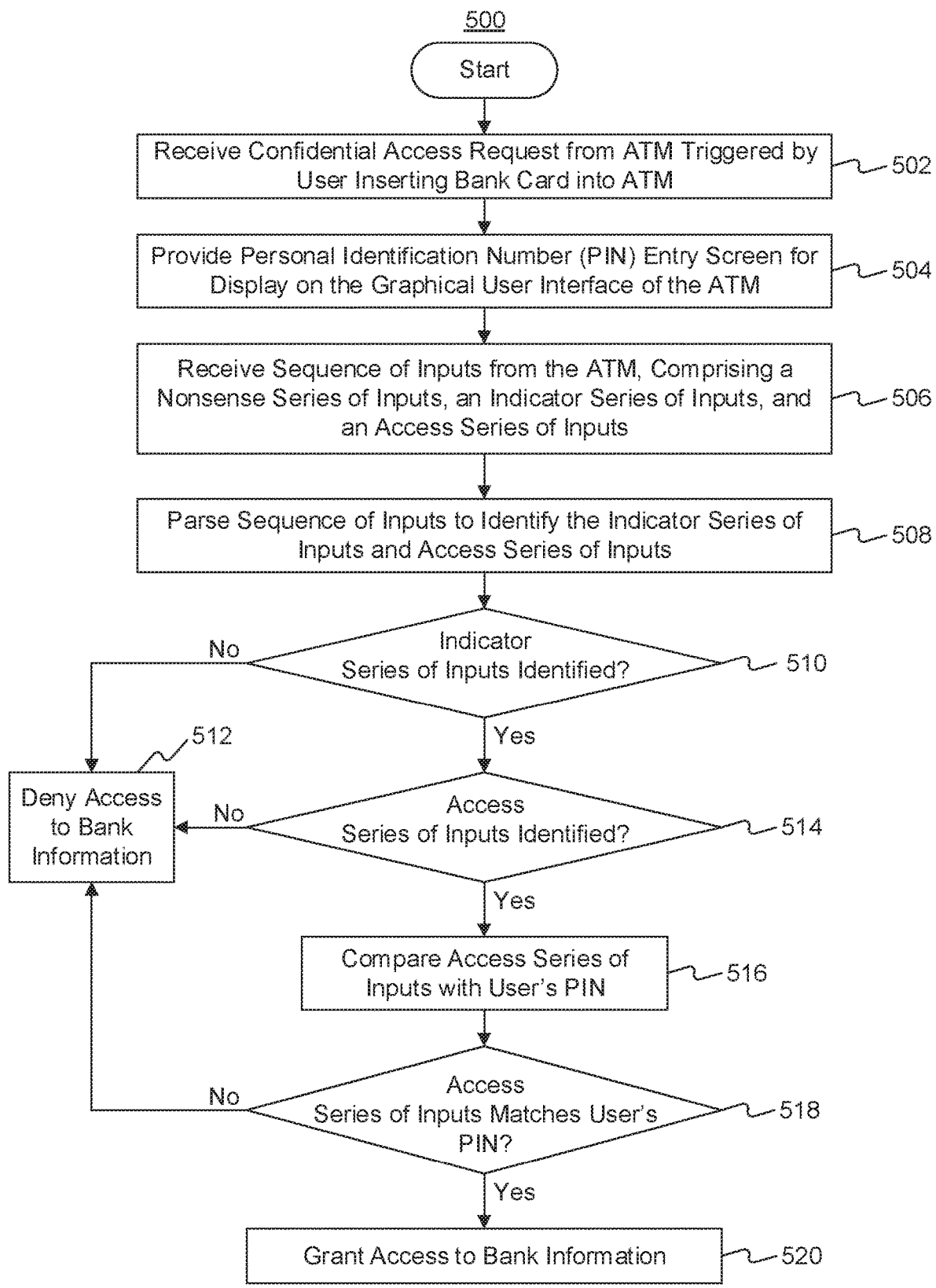
FIG. 5 is a flowchart of an exemplary system for the secure entry of a PIN into an ATM, consistent with the embodiments of the present invention.

FIG. 5 is a flowchart of example method 500 for the secure entry of a PIN into an ATM designed to receive an indicator signal from a user device. Method 500 may include an ATM as user device 102.

At step 502, the method may receive a request for confidential access triggered by user 101 inserting a bank card into the ATM. The request for confidential access may comprise a request for access to bank information associated with the bank card. At step 504, the method may provide a PIN entry screen for display on the graphical user interface of the ATM. The PIN entry screen may comprise a single-entry field for user inputs.

At step 506, the method may receive a group of inputs from the ATM, which may comprise a dummy sequence of inputs, an indicator sequence of inputs, and an access sequence of inputs. In this example, the group of inputs received may be a dummy sequence of inputs, followed by an indicator sequence of inputs, followed by an access sequence of inputs. By way of further example, if the indicator sequence of inputs is "900," the group of inputs received may be "38649007662." In this example, the digits "3," "8," "6," and "4" corresponds to the dummy sequence of inputs, the digits "9," "0," and "0" correspond to the indicator sequence of inputs, and the digits "7," "6," "6," and "2" correspond to the access sequence of inputs.

As with methods 300 and 400, in certain other embodiments, the method may limit the access sequence of inputs to a predetermined number of inputs. The method may receive a group of inputs from the ATM, which may comprise a first dummy sequence of inputs, an indicator sequence of inputs, an access sequence of inputs, and a second dummy sequence of inputs. In this example, the group of inputs received may be a first dummy sequence of inputs, followed by an indicator sequence of inputs, followed by an access sequence of inputs, followed by a second dummy sequence of inputs. By way of further example, if the indicator sequence of inputs is "900," and the access sequence of inputs is limited to four inputs, the group of inputs received may be "3864900766201." In this example, the digits "3," "8," "6," and "4" corresponds to the first dummy sequence of inputs, the digits "9," "0," and "0" correspond to the indicator sequence of inputs, the digits "7," "6," "6," and "2" correspond to the access sequence of inputs, and the digits "0" and "1" correspond to the second dummy sequence of inputs.

At step 508, the method may parse the group of inputs to identify the location of the indicator sequence of inputs and the access sequence of inputs. By way of the previous example, the digits "38649007662" may be parsed to determine the location of the indicator sequence of inputs and access sequence of inputs. In this example, the indicator sequence of inputs is identified by parsing the numbers. In this same example, the digits "7," "6," "6," and "2" immediately following the indicator sequence of inputs would be identified as the access sequence of inputs.

At step 510, method may determine whether an indicator sequence of inputs has been identified. If no indicator sequence of inputs is identified, the method may deny the user access to the bank information associated with the bank card 512. For example, if the indicator sequence of inputs associated with the bank card is "900," and the number "900" is not identified after parsing, access may be denied. If the indicator sequence of inputs has been identified, then at step 514 the method may determine if an access sequence of inputs has been identified. If an access sequence of inputs has not been identified, the method may deny access to the bank information associated with the bank card 514. For example, if there are no inputs received following the indicator sequence of inputs, access may be denied.

At step 516, the method may compare the access sequence of inputs with the PIN associated with the bank card. At step 518, the method may determine if the access sequence of inputs matches the PIN associated with the bank card. If the access sequence of inputs does not match the PIN associated with the bank card, access to the bank information may be denied, at 512. For example, if the access sequence of inputs is identified as "7662," and the PIN associated with the bank card is "7663," a match will not be identified, and access may be denied. If the access sequence of inputs does match the PIN associated with the bank card, then at step 520 the method may grant access to the bank information. For example, if the access sequence of inputs is identified as "7662," and the PIN associated with the bank card is "7662," a match will be identified, and access may be granted.

Figure 6:
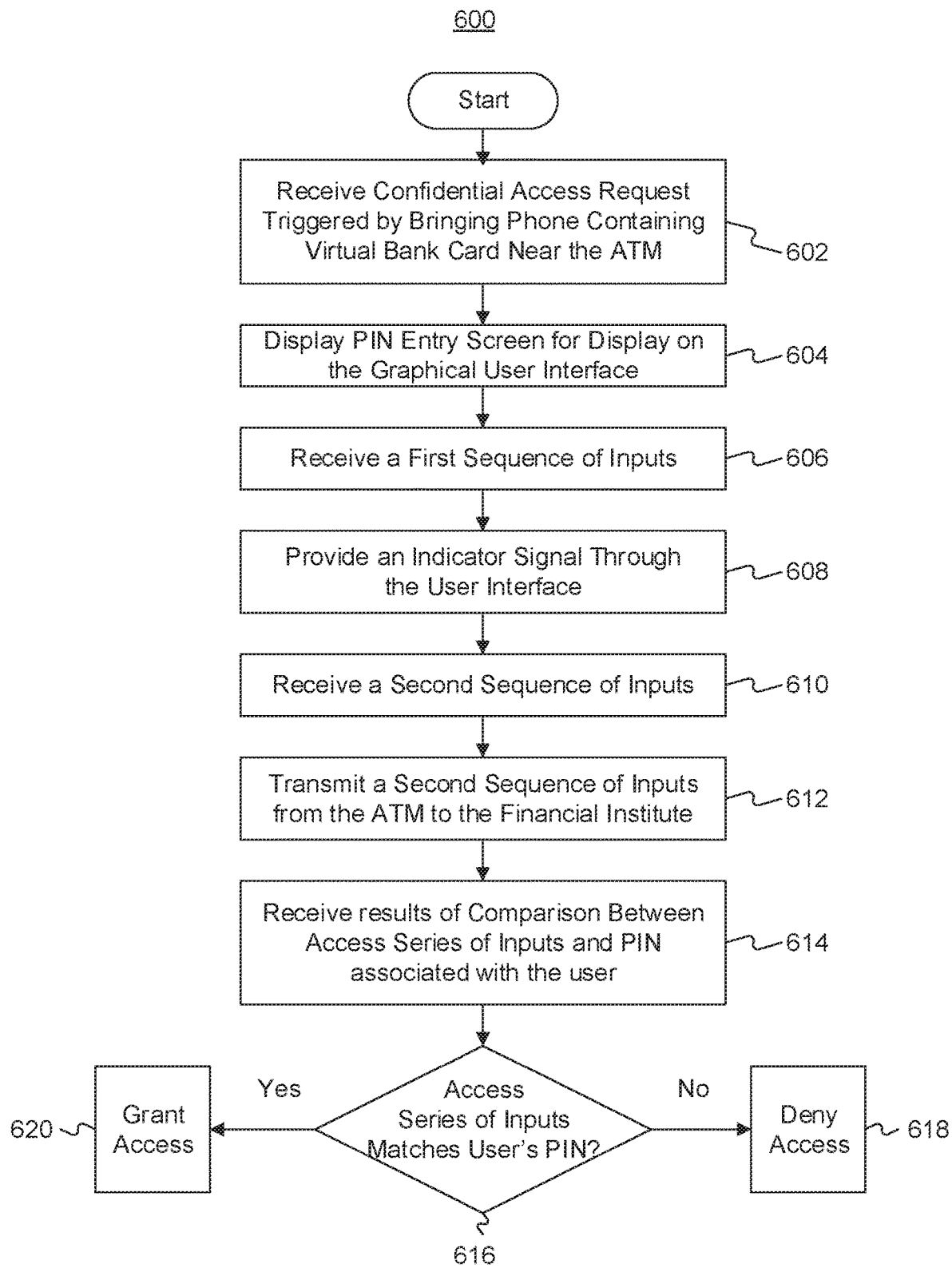
FIG. 6 is a flowchart of an exemplary system for the secure entry of a PIN into an ATM, consistent with the embodiments of the present invention.

FIG. 6 is a flowchart of example method 600 for the secure entry of a PIN into an ATM designed to provide an indicator signal through a user device to a user. Method 600 may include an ATM as user device 102.

At step 602, the method may receive a request for confidential access triggered by user 101 through NFC by bringing a mobile phone containing a virtual bank card in proximity to the ATM. The request for confidential access may comprise a request for access to bank information associated with the bank card. At step 604, the method may provide a PIN entry screen for display on the graphical user interface of the ATM. The PIN entry screen may comprise a single-entry field for user inputs.

At step 606, the method may receive a group of inputs from the ATM, which may comprise a dummy sequence of inputs. The dummy sequence of inputs may be any combination of inputs. For example, the dummy sequence of inputs may be "1" or "0458464376." Since the ATM provides the indicator signal, there is no risk of user 101 accidently entering an indicator sequence of inputs.

At step 608, the method may provide an indicator signal through the user interface of the ATM. For example, the indicator signal may comprise a flashing light on the GUI of the ATM, or a beeping sound through the speakers of the ATM. In certain aspects, the method may provide the indicator signal through the ATM after receiving a certain amount of dummy inputs. In other aspects, the method may provide the indicator signal through the ATM after receiving a randomized number of dummy inputs. In still other aspects, the method may provide the indicator signal after a set or randomized period of time following the request for confidential access.

At step 610, the method may receive a second group of inputs from the ATM. The second group of inputs may comprise an access sequence of inputs. The access sequence of inputs may comprise any user inputs received following the indicator signal. For example, the access sequence of inputs may be "1" or "7662." Indicator signal will inform user 101 when to enter the confidential access code. By way of further example, assume that the correct indicator sequence is "4736" and the correct access sequence is the user's PIN "7662." The method may receive a group of inputs with the numbers "4736," which is the correct indicator sequence. The method will then provide a flashing light through the GUI of the ATM, and then receive the numbers "7662." The numbers following the flashing light, "7662," constitute the access sequence, and are compared with the PIN associated with the bank card. In some embodiments, the method may only accept receipt of the second group of inputs for a limited period of time following the indicator signal. For example, the method may receive inputs for no longer than 20 seconds following the indicator signal. In other embodiments, the method may receive second group of inputs for a randomized time following the indicator signal. For example, the method may receive inputs for a limited time of between 20-300 seconds following the indicator signal.

At step 612, the method may transmit the second group of inputs to financial institution 104 by way of network 106 for authentication. At step 614, the method may receive the results of the comparison between the access sequence of inputs and the PIN associated with user 101 from financial institution 104 by way of network 106. At step 616, the method may determine, from the comparison results, whether the access sequence of inputs matches the PIN associated with the bank card. If the access sequence of inputs does not match the PIN associated with the bank card, access to the bank information may be denied 618. If the access sequence of inputs does match the PIN associated with the bank card, access to the bank information may be granted 620. By way of the previous example, the access sequence of inputs received may be the digits "7662." The method transmits the access sequence of inputs to financial institute 104 through network 106 for authentication. The method then receives the results of the authentication. Since the PIN in the example above is also "7662," access to the bank information will be granted. However, if the transmitted access sequence is not "7662," access to the bank information will be denied.

Embodiments of the present disclosure also relate to methods and computer-readable media that implement the above embodiments.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A user device for providing a secure entry of a confidential access code associated with the user, comprising:
   a user interface;
   at least one memory storing instructions; and
   at least one processor configured to execute the instructions to perform operations comprising:
      receiving, from a user through the user interface, a request for confidential access associated with the user;
      prompting the user, via the user interface, to enter inputs into a single-entry field;
      receiving, from the user device, a first group of inputs comprising a sequence of dummy inputs;
      providing, through the user device, an indicator signal prompting the user to transition from inputting the sequence of dummy inputs to inputting an access sequence of inputs, the indicator signal being provided after a number of received dummy inputs has reached a set amount, the set amount being a randomized value;
      receiving, from the user device, a second group of inputs comprising the access sequence of inputs;
      comparing the access sequence of inputs with a confidential access code;
      when the access sequence of inputs matches the confidential access code, granting access to the user device; and
      when the access sequence of inputs does not match the confidential access code, denying access to the user device.

2. The device of claim 1, wherein the operations further comprise receiving the sequence of dummy inputs prior to providing the indicator signal.

3. The device of claim 2, wherein the operations further comprise receiving the access sequence of inputs after providing the indicator signal.

4. The device of claim 3, wherein the operations further comprise receiving a second sequence of dummy inputs following the access sequence of inputs.

5. The device of claim 3, wherein the operations further comprise providing a second indicator signal following the receipt of the access sequence of inputs.

6. The device of claim 5, wherein the operations further comprise receiving a second sequence of dummy inputs following the second indicator signal.

7. The device of claim 1, wherein the user device comprises at least one of an Automated Teller Machine, a smartphone, a tablet, or a personal computer.

8. The device of claim 1, wherein the confidential access request associated with the user comprises introducing a bank card in proximity to an Automated Teller Machine.

9. The device of claim 1, wherein providing an indicator signal comprises providing an indicator signal through a user interface of the user device.

10. The device of claim 9, wherein the indicator signal comprises a visual indication.

11. The device of claim 1, wherein the operations further comprise setting a time limit for entering the second group of inputs following the indicator signal.

12. A method for secure entry of a confidential access code to a user device, comprising:
   receiving, at the user device, a request for confidential access associated with a user;

displaying, on a graphical user interface of the user device, an input entry screen comprising a single-entry field;

receiving, at the user device, a first group of inputs comprising a sequence of dummy inputs;

providing a first indicator signal prompting the user to transition from inputting the sequence of dummy inputs to inputting an access sequence of inputs through the graphical user interface, the first indicator signal being provided after a number of received dummy inputs has reached a set amount, the set amount being a randomized value;

receiving, at the user device, a second group of inputs comprising the access sequence of inputs;

transmitting the second group of inputs to a server;

receiving, from the server, a result of a comparison of the access sequence of inputs to a confidential access code; and providing or denying, by at least one processor, access to the user device based on at least the result of the comparison.

13. The method of claim 12, further comprising providing a second indicator signal following receipt of the access sequence of inputs.

14. The method of claim 13, further comprising receiving a second sequence of dummy inputs following the second indicator signal.

15. The method of claim 13, wherein providing the second indicator signal comprises providing a second indicator signal that is identical to the first indicator signal.

16. The method of claim 12, wherein providing the first indicator signal comprises providing a visual indication.

17. The method of claim 12, wherein providing the first indicator signal comprises providing an auditory indication.

18. A non-transitory computer-readable medium containing program instructions which, when executed by a processor, provide secure entry, by a user, of a confidential access code associated with the user, into an Automated Teller Machine by performing operations comprising:

receiving a request for confidential access, the request comprising introducing a bank card in proximity to the Automated Teller Machine;

upon introduction of the bank card, displaying, on a graphical user interface of the Automated Teller Machine, a single field for entering a personal identification number;

receiving a first group of inputs comprising a sequence of dummy inputs;

providing an indicator signal prompting the user to transition from inputting the sequence of dummy inputs to inputting an access sequence of inputs through the graphical user interface, the indicator signal being provided after a number of received dummy inputs has reached a set amount, the set amount being a randomized value;

receiving a second group of inputs comprising the access sequence of inputs;

transmitting the second group of inputs to a server;

receiving a message from the server indicating a result of a comparison of the access sequence of inputs to a confidential access code;

when the message indicates a match between the confidential access code and the access sequence of inputs, granting access to bank information associated with the bank card; and when the message indicates no match between the confidential access code and the access sequence of inputs, denying access to the bank information.

* * * * *